(12) United States Patent
Guinan et al.

(10) Patent No.: US 6,351,940 B1
(45) Date of Patent: Mar. 5, 2002

(54) INVERTER DUCTING FOR DUAL FAN CONCEPT

(75) Inventors: Daniel P. Guinan, Hobe Sound; David J. Huber; Gary M. Perkins, both of Palm Beach Gardens, all of FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/475,877

(22) Filed: Dec. 30, 1999

(51) Int. Cl.⁷ .................................................. F02K 3/02
(52) U.S. Cl. ....................................... 60/226.1; 60/262
(58) Field of Search .............................. 60/226.1, 262, 60/263; 415/184, 185, 208.2, 24.2

(56) References Cited

U.S. PATENT DOCUMENTS

| | | | |
|---|---|---|---|
| 3,096,954 A | * 7/1963 | Bauger et al. | 60/226.1 X |
| 4,054,030 A | * 10/1977 | Pedersen | 60/262 |
| 4,222,234 A | * 9/1980 | Adamson | 60/226.1 |
| 4,290,262 A | * 9/1981 | Wynosky et al. | 60/262 |
| 4,782,657 A | * 11/1988 | Lewis et al. | 60/226.1 |

* cited by examiner

*Primary Examiner*—Charles G. Freay
*Assistant Examiner*—David J. Torrente (57) ABSTRACT

Accordingly, the present invention provides a ducting system for use on a gas turbine engine having two fans connected to a common shaft, and includes a primary inlet duct that is integral with a plurality of primary discharge ducts, a plurality of secondary inlet ducts that are integral with a secondary discharge duct, each of the ducts includes a port, the ports of the secondary inlet ducts are located radially outward of the port of the primary inlet duct, and the ports of the primary discharge ducts are located radially outward of the port of the secondary discharge duct.

5 Claims, 6 Drawing Sheets

INVERTER DUCTING FOR DUAL FAN CONCEPT

DESCRIPTION

1. Field of the Invention

This invention relates to gas turbine engines, and specifically to gas turbine engines that produce very high airflow through the fan portion thereof.

2. Background of the Invention

In typical aircraft gas turbines engines, a fan is used upstream of the low compressor to maximize the amount of thrust that an engine can produce for a given rate of fuel consumption. By increasing the size of the fan, the thrust produced by an engine can be significantly increased without significantly increasing the fuel consumption of the engine. Therefore, designers of aircraft gas turbine engines have typically increased the diameter of the fan on gas turbine engines whenever the need for additional thrust has occurred.

However, as the diameter of fans have become larger, engine designers have encountered several problems. One problem is that, as the individual fans blades become longer, the thickness of each blade must be increased to handle the additional centripetal force generated by the longer blade. As a result, blades must become heavier to be made from the same materials to handle the additional loading in each blade at the root and platform thereof, or the blades must be manufactured from lighter, more expensive materials. Since one of the goals of designers of aircraft gas turbine engines is to minimize both weight and cost, neither of these options is considered to be desirable.

Another problem is that the diameter of blades on some engines has reached the point where the speed of the tips of the fan blades are near supersonic. If the tip speeds should become supersonic, additional stresses would be introduced into the blades, and therefore the blades would have to be redesigned to tolerate such additional stresses. This type of redesign would require expensive design and testing, which would further increase the cost of higher thrust aircraft engines.

An additional problem is that as the length of each blade increases, it becomes more difficult to design the blade so that it flows air efficiently along its full length, because the relative speed of each blade adjacent to root thereof is much slower than the speed of the blade adjacent the tip thereof. And as the diameter of the fan increases, the ground clearance for wing mounted engines must be increased to prevent the engine nacelles from impacting the runway during takeoffs and landings.

What is needed is means for increasing airflow through the fan portion of a gas turbine engine without increasing the diameter of the fan.

SUMMARY OF THE INVENTION

It is therefore object of the present invention to provide a means for increasing airflow through the fan portion of a gas turbine engine without increasing the diameter of the fan.

Accordingly, the present invention provides a ducting system for use on a gas turbine engine having two fans connected to a common shaft, and includes a primary inlet duct that is integral with a plurality of primary discharge ducts, a plurality of secondary inlet ducts that are integral with a secondary discharge duct, each of the ducts includes a port, the ports of the secondary inlet ducts are located radially outward of the port of the primary inlet duct, and the ports of the primary discharge ducts are located radially outward of the port of the secondary discharge duct.

The foregoing and other features and advantages of the present invention will become more apparent from the following description and accompanying drawings.

DESCRIPTION OF THE PREFERRED EMBODIMENT OF THE PRESENT INVENTION

Figure 1:
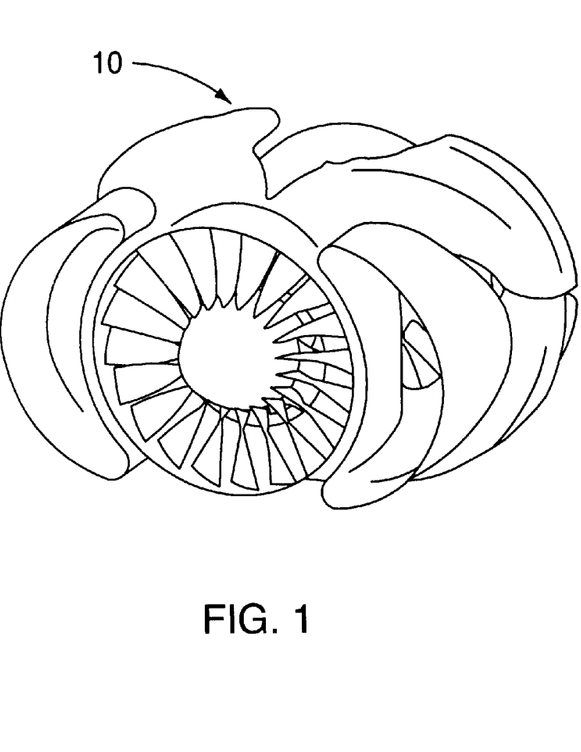
FIG. 1 is an isometric view of the ducting system of the present invention showing a fan located therein.
Figure 2:
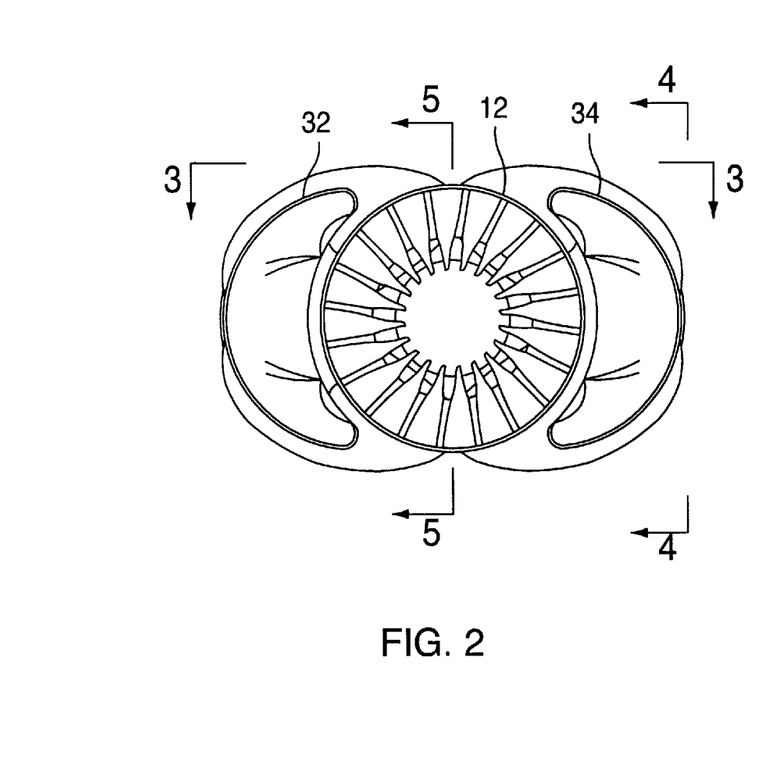
FIG. 2 is a plan view showing the primary and secondary inlets of the ducting system of the present invention showing a fan located therein.
Figure 3:
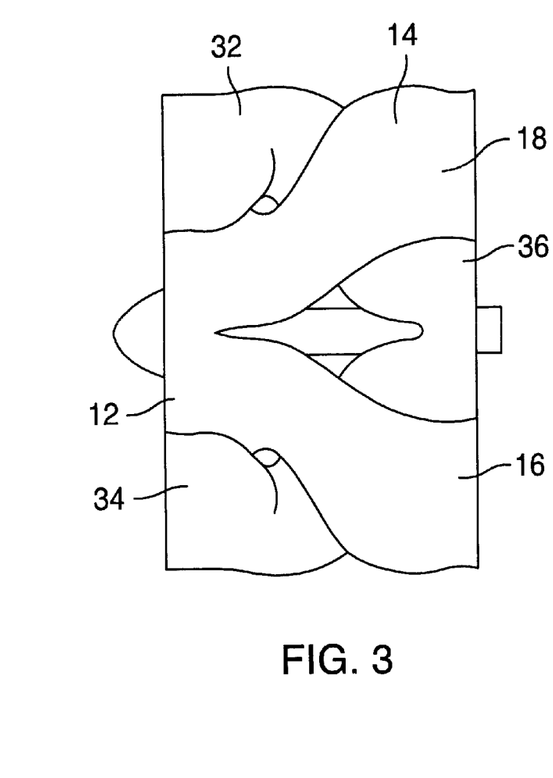
FIG. 3 is a plan view taken along line 3—3 of FIG. 2.
Figure 4:
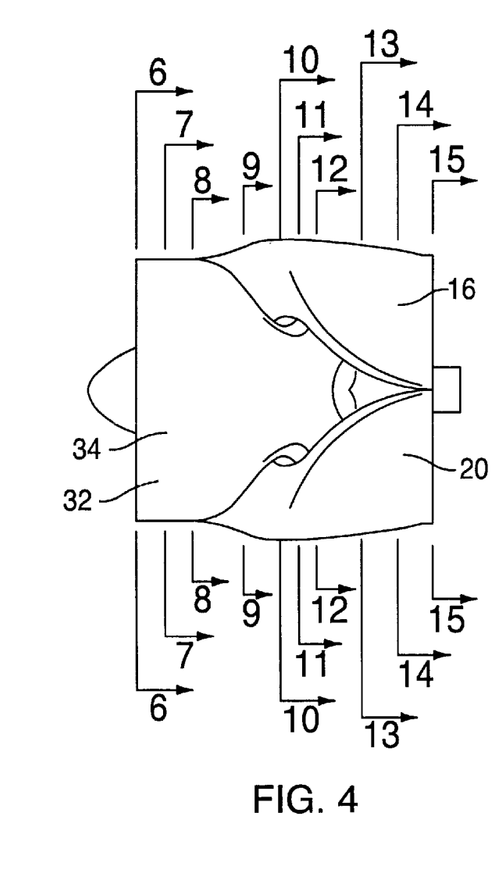
FIG. 4 is a plan view taken along line 4—4 of FIG. 2.
Figure 6:
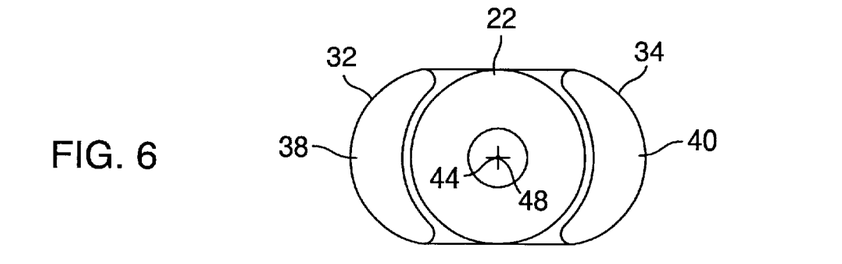
FIG. 6 is a cross-sectional view taken along line 6—6 of FIG. 4.
Figure 7:
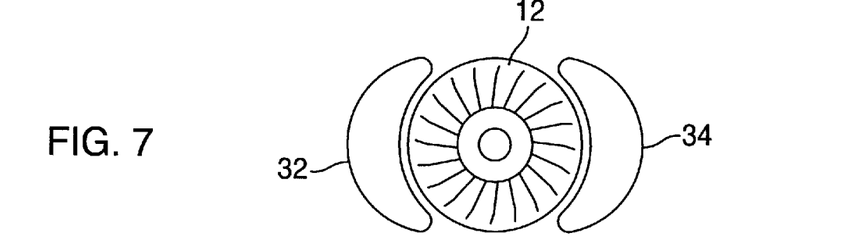
FIG. 7 is a cross-sectional view taken along line 7—7 of FIG. 4.
Figure 8:
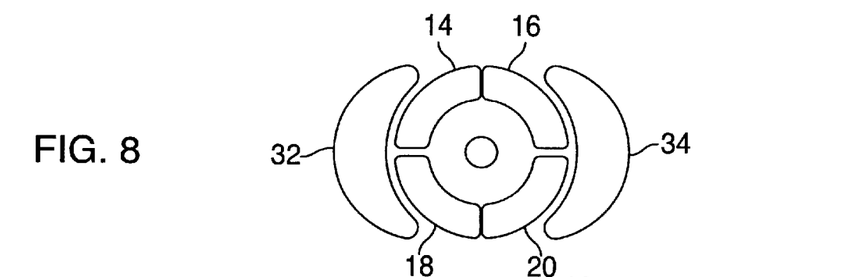
FIG. 8 is a cross-sectional view taken along line 8—8 of FIG. 4.
Figure 9:
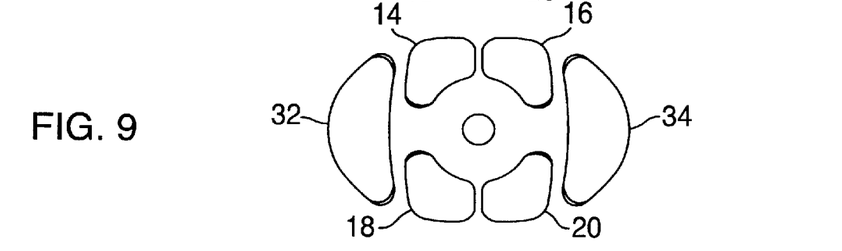
FIG. 9 is a cross-sectional view taken along line 9—9 of FIG. 4.
Figure 10:
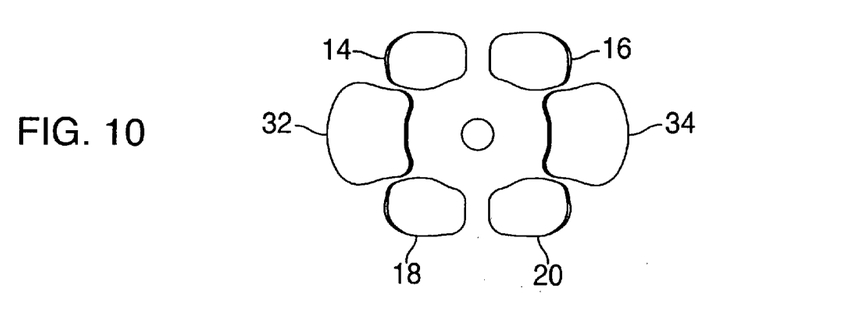
FIG. 10 is a cross-sectional view taken along line 10—10 of FIG. 4.
Figure 11:
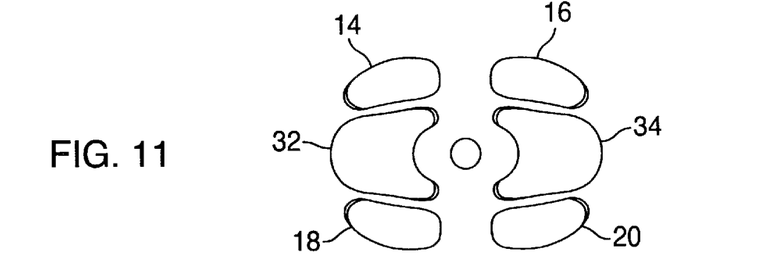
FIG. 11 is a cross-sectional view taken along line 11—11 of FIG. 4.
Figure 12:
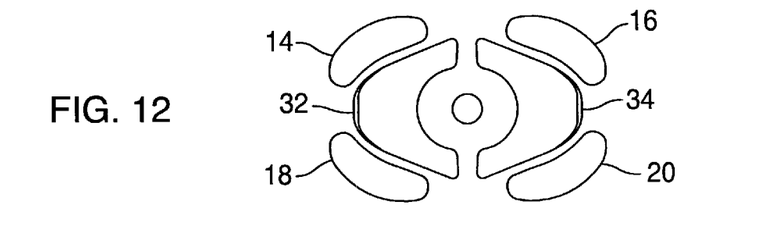
FIG. 12 is a cross-sectional view taken along line 12—12 of FIG. 4.
Figure 13:
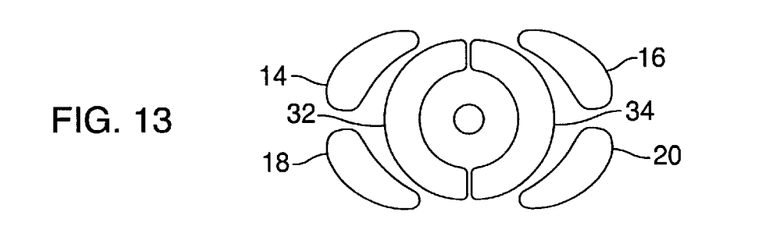
FIG. 13 is a cross-sectional view taken along line 13—13 of FIG. 4.
Figure 14:
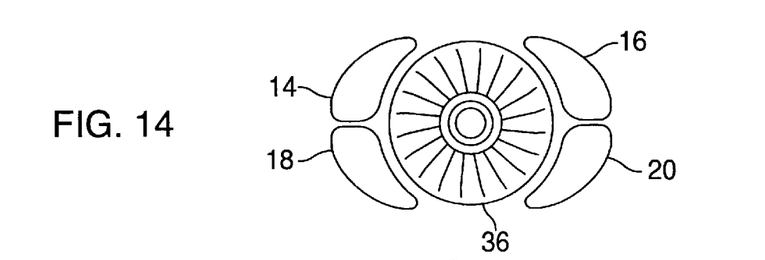
FIG. 14 is a cross-sectional view taken along line 14—14 of FIG. 4.

The ducting system 10 of the present invention, as shown in the isometric view of FIG. 1, is intended for use on a gas turbine engine having two fans connected to a common shaft. As shown in FIGS. 2–4, the ducting system 10 includes a single primary inlet duct 12, and four primary discharge ducts 14, 16, 18, 20. The primary inlet duct 12 includes a circular inlet port 22, as shown in FIG. 6, and the primary inlet duct 12 has a constant flow area along its length. Each of the primary discharge ducts 14, 16, 18, 20 is integral with the primary inlet duct 12, and the circular inlet port 22 is located at one end of the primary inlet duct 12 distant from the primary discharge ducts 14, 16, 18, 20.

Figure 15:
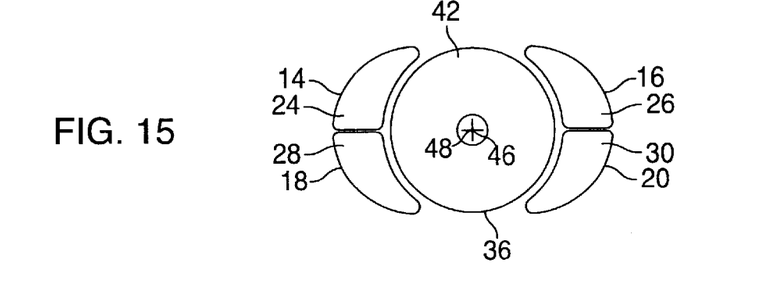
FIG. 15 is a cross-sectional view taken along line 15—15 of FIG. 4.

Each of the primary discharge ducts 14, 16, 18, 20, has a primary discharge port 24, 26, 28, 30, as shown in FIG. 15, located at one end thereof distant from the primary inlet duct 12. Each of the primary discharge ducts 14, 16, 18, 20, has a constant flow area throughout its length, and each of the primary discharge ducts 14, 16, 18, 20, has a flow area equal to one-fourth (0.25) of the flow area of the primary inlet duct 12. Likewise, each of the primary discharge ports 24, 26, 28, 30 has a flow area equal to one-fourth (0.25) of the flow area of the circular inlet port 22.

As shown in FIGS. 2–4, the ducting system 10 of the present invention also includes two secondary inlet ducts 32, 34 and a single secondary discharge duct 36. Each of the secondary inlet ducts 32, 34 is integral with the secondary discharge duct 36, and each of the secondary inlet ducts 32, 34 has an inlet port 38, 40 located at one end thereof distant from the secondary discharge duct 36, and the secondary discharge duct 36 has a circular secondary discharge port 42 located at one end thereof distant from the secondary inlet ducts 32, 34. The flow area of the secondary discharge duct 36 is constant along the length thereof, and the flow area of each of the secondary inlet ducts 32, 34 is constant along the length thereof. Each of the secondary inlet ducts 32, 34 has a flow area equal to one-half (0.5) of the circular secondary discharge duct 36. Likewise, the flow area of each of the secondary inlet ports 38, 40 is equal to one-half (0.5) of the flow area of the circular secondary discharge port 42.

Figure 5:
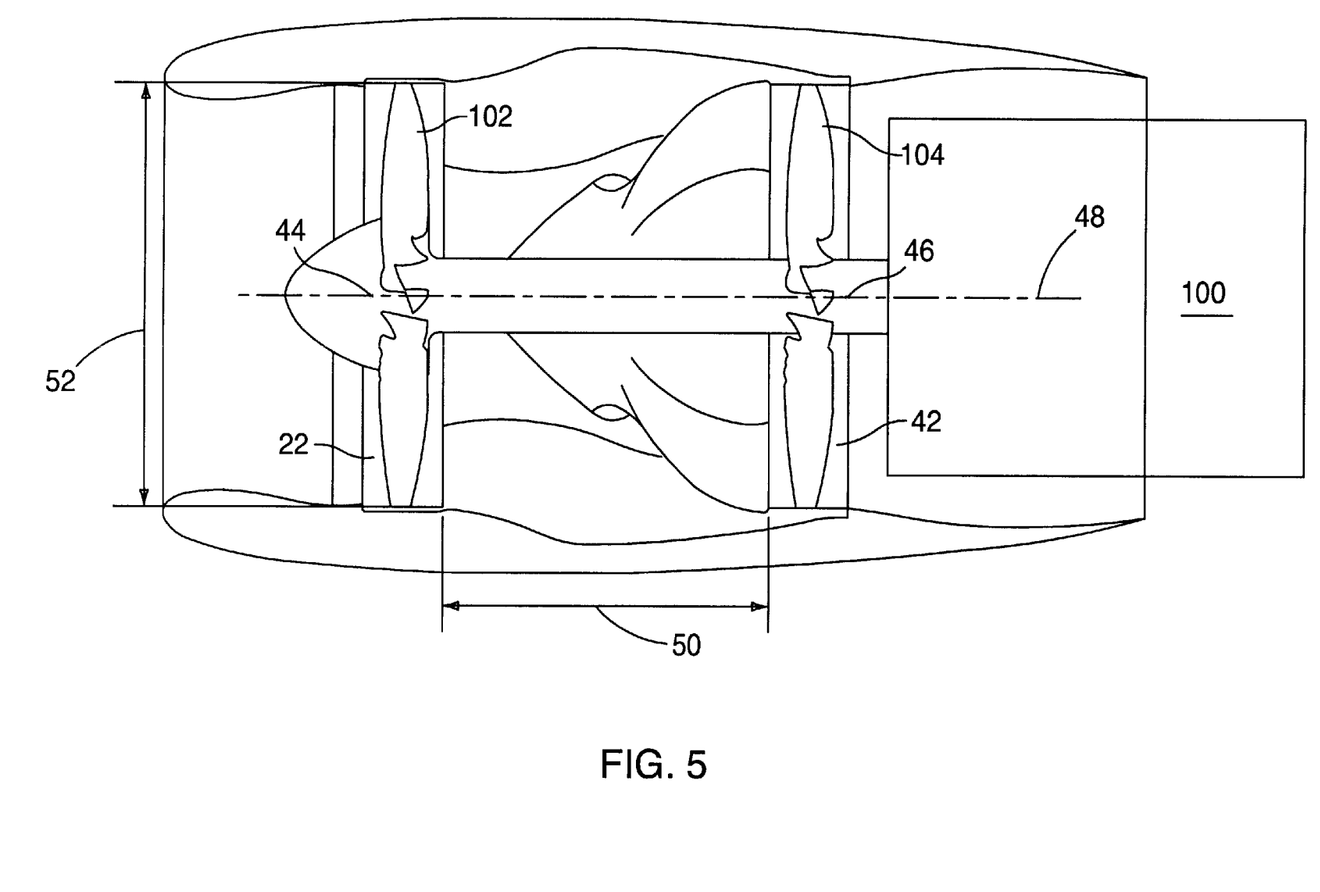
FIG. 5 is a cross-sectional view of the ducting system of the present invention taken along line 5—5 of FIG. 3.

As shown in FIG. 5, the circular inlet port 22 and the circular discharge port 42 are coaxial, and the center 44 of the circular inlet port 22 and the center 46 of the circular discharge port 42 are both located on a reference axis 48 that is coaxial with the shaft shown in FIG. 5. As shown in FIG. 6, the secondary inlet ports 38, 40 are located radially outward of the circular inlet port 22 relative to the reference axis 48. As shown in FIG. 15, the primary discharge ports 24, 26, 28, 30 are located radially outward of the circular discharge port 42 relative to the reference axis 48.

Figure 16:
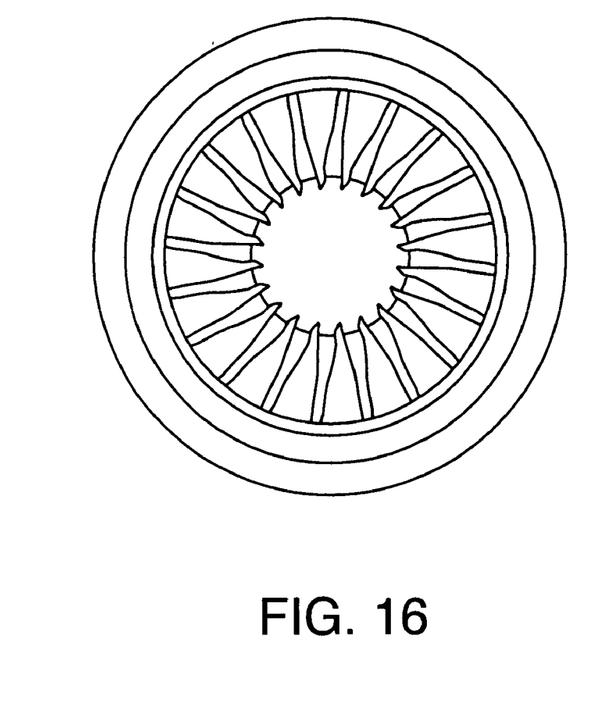
FIG. 16 shows a plan view of the inlet of the typical aircraft gas turbine engine.
Figure 17:
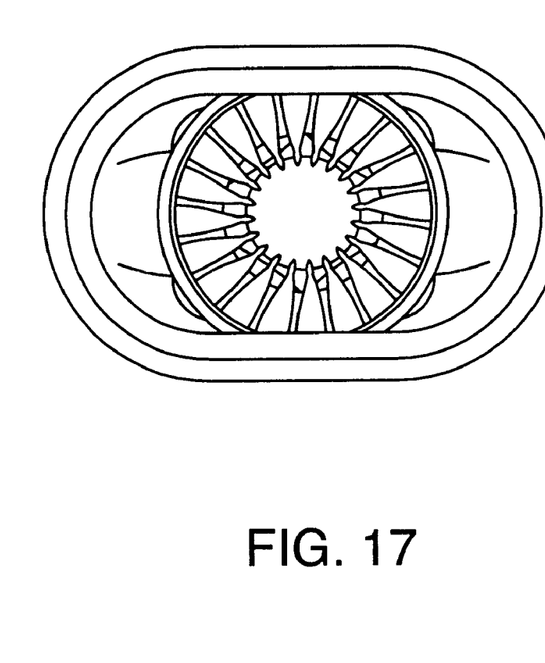
FIG. 17 shows a plan view of the inlet of an aircraft gas turbine engine incorporating the ducting system of the present invention.

As shown in FIG. 5, the present invention can be used in combination with a gas turbine engine 100 having two fans 102, 104 connected to a single shaft as part of a propulsion system in which each of the fans 102, 104 has substantially the same diameter. Preferably, the distance 50 between the fans 102, 104 is equal to three-fourths (0.75) of the diameter 52 of the fans 102, 104. As shown in FIGS. 6–15, the ducting system 10 of the present invention provides a smooth transition from the inlet ports 22, 38, 40 to the discharge ports 24, 26, 28, 30, 42. As a result, the same airflow that is produced by a typical aircraft having a single large fan, as shown in FIG. 16, can be achieved by using the ducting system 10 of the present invention in combination with a gas turbine engine having two smaller fans as shown in FIG. 5. The resulting engine inlet is shown in FIG. 17. As those skilled in the art will readily appreciate, by replacing one large fan with two smaller diameter fans, this same airflow can be produced at slower blade tip speeds, while at same time reducing the force load on individual fan blades.

Although the invention has been shown and described with respect to a preferred embodiment thereof it should be understood by those skilled in the art that other various changes and omissions in the form and detail of the invention may be made without departing from the spirit and scope thereof. Specifically, it should be obvious that the ducting system 10 of the present invention could be reversed such that each of the discharge ports 24, 26, 28, 30, 42 becomes in inlet port, and each of the inlet ports 22, 38, 40 becomes a discharge port. Such is contemplated by the present invention, and it used to be understood at the terms "inlet" and "discharge" have been included in the description of the present invention for purposes of clarity only, and are not intended to limit scope of the claimed invention.

We claim:

1. A ducting system for use on a gas turbine engine having two fans connected to a common shaft, said ducting system comprising:

a primary inlet duct and a plurality of primary discharge ducts, each of said primary discharge ducts is integral with said primary duct, said primary inlet duct having a circular primary inlet port located at one end thereof distant from said primary discharge ducts, and each of said primary discharge ducts having a primary discharge port located at one end thereof distant from said primary inlet duct;

a plurality of secondary inlet ducts and a single secondary discharge duct, each of said secondary inlet ducts is integral with said secondary discharge duct, each of said secondary inlet ducts having a secondary inlet port located at one end thereof distant from said secondary discharge duct, and said secondary discharge duct having a circular secondary discharge port located at one end thereof distant from said secondary inlet ducts;

a reference axis;

wherein the center of the circular primary inlet port and the center of the circular secondary discharge port are both located on said reference axis, said secondary inlet ports are located radially outward of said circular primary inlet port relative to said reference axis, and said primary discharge ports are located radially outward of said circular secondary discharge port relative to said reference axis; and wherein the flow are of the primary inlet duct is constant along the length thereof, the flow area of each of the primary discharge ducts is constant along the length thereof, and the flow area of each of the primary discharge ports is equal to one-fourth of the flow area of the circular primary inlet port.

2. The ducting system of claim 1 wherein the flow area of the secondary discharge duct is constant along the length thereof, the flow area of each of the secondary inlet ducts is constant along the length thereof, and the flow area of each of the secondary inlet ports is equal to one-half of the flow area of the circular secondary discharge port.

3. A propulsion system comprising:

a gas turbine engine having two fans connected to a single shaft, each of said fans having substantially the same diameter;

a primary inlet duct and a plurality of primary discharge ducts, each of said primary discharge ducts is integral with said primary duct, said primary inlet duct having a circular primary inlet port located at one end thereof distant from said primary discharge ducts, and each of said primary discharge ducts having a primary discharge port located at one end thereof distant from said primary inlet duct;

a plurality of secondary inlet ducts and a single secondary discharge duct, each of said secondary inlet ducts is integral with said secondary discharge duct, each of said secondary inlet ducts having a secondary inlet port located at one end thereof distant from said secondary discharge duct, and said secondary discharge duct having a circular secondary discharge port located at one end thereof distant from said secondary inlet ducts;

a reference axis;

wherein the center of the circular primary inlet port and the center of the circular secondary discharge port are both located on said reference axis, said secondary inlet ports are located radially outward of said circular primary inlet port relative to said reference axis, said primary discharge ports are located radially outward of said circular secondary discharge port relative to said reference axis, one of said fans is located in said circular primary inlet port, and said other fan is located in said circular secondary discharge port; and wherein the flow area of the primary inlet duct is constant along the length thereof, the flow area of each of the primary discharge ducts is constant along the length thereof, and the flow area of each of the primary discharge ports is equal to one-fourth of the flow area of the circular primary inlet port.

4. The propulsion system of claim 3 wherein the flow area of the secondary discharge duct is constant along the length thereof, the flow area of each of the secondary inlet ducts is constant along the length thereof, and the flow area of each of the secondary inlet ports is equal to one-half of the flow area of the circular secondary discharge port.

5. A propulsion system comprising:

a gas turbine engine having a first fan and a second fan, each of said fans being connected to a single shaft, each of said fans having substantially the same diameter;

a primary inlet duct and a plurality of primary discharge ducts, each of said primary discharge ducts is integral wit said primary duct, said primary inlet duct having a circular primary inlet port located at one end thereof distant from said primary discharge ducts, and each of said primary discharge ducts having a primary discharge port located at one end thereof distant from said primary inlet duct;

a plurality of secondary inlet ducts and a single secondary discharge duct, each of said secondary inlet ducts is integral with said secondary discharge duct, each of said secondary inlet ducts having a secondary inlet port located at one end thereof distant from said secondary discharge duct, and said secondary discharge duct having a circular secondary discharge port located at one end thereof distant from said secondary inlet ducts; and a reference axis, wherein the center of the circular primary inlet port and the center of the circular secondary discharge port are both located on said reference axis, said secondary inlet ports are located radially outward of said circular primary inlet port relative to said reference axis, said primary discharge ports are located radially outward of said circular secondary discharge port relative to said reference axis, one of said fans is located in said circular primary inlet port, and said other fan is located in said circular secondary discharge port; and wherein said first fan and said second fan are disposed in front of a compressor section of said gas turbine engine.

* * * * *

UNITED STATES PATENT AND TRADEMARK OFFICE
CERTIFICATE OF CORRECTION

PATENT NO. : 6,351,940 B1
DATED : March 5, 2002
INVENTOR(S) : Daniel P. Guinan et al.

It is certified that error appears in the above-identified patent and that said Letters Patent is hereby corrected as shown below:

Column 4,
Line 27, should read -- wherein the flow area of the primary inlet duct.... --

Signed and Sealed this

First Day of October, 2002

Attest:

Attesting Officer

JAMES E. ROGAN
Director of the United States Patent and Trademark Office